Figure 1:
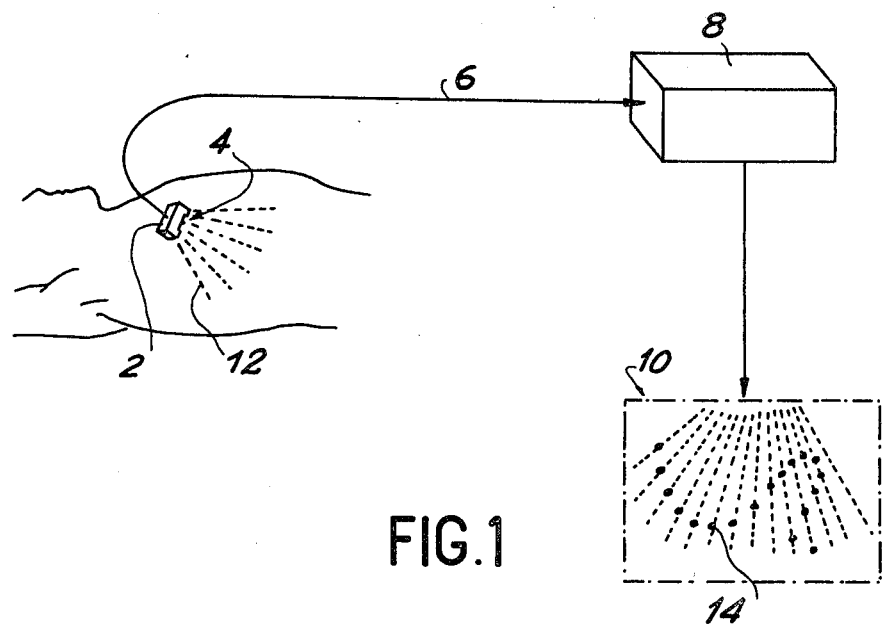

United States Patent [19]

Dubuis et al.

[11] 4,422,332
[45] Dec. 27, 1983

[54] DYNAMIC FOCUSING AND SECTORIAL SCANNING ECHOGRAPHY DEVICE

[75] Inventors: Jean-Charles Dubuis, Saint Martin d'Heres; Michel Martin, Eybens; Bernard Piaget, Gieres; Jean-Francois Piquard, Vizille; Jacques Vacher, Seyssinet, all of France

[73] Assignee: Commissariat a l'Energie Atomique, Paris, France

[21] Appl. No.: 264,576

[22] Filed: May 18, 1981

[30] Foreign Application Priority Data

May 19, 1980 [FR] France .................. 80 11109

[51] Int. Cl.³ ............................................ G01N 29/00
[52] U.S. Cl. .................................... 73/625; 128/660
[58] Field of Search .............. 73/619, 624, 625, 626, 73/628, 641; 128/660

[56] References Cited

U.S. PATENT DOCUMENTS

| | | | |
|---|---|---|---|
| 4,152,678 | 5/1979 | Shott et al. | 73/619 X |
| 4,173,007 | 10/1979 | McKeighen et al. | 73/625 X |
| 4,180,792 | 12/1979 | Lederman et al. | 128/660 X |
| 4,227,417 | 10/1980 | Glenn | 73/625 |
| 4,334,432 | 6/1982 | Gill | 73/625 |

FOREIGN PATENT DOCUMENTS

| | | |
|---|---|---|
| 68 | 12/1978 | European Pat. Off. |
| 2347693 | 11/1977 | France. |
| 2373087 | 6/1978 | France. |
| 2413669 | 7/1979 | France. |
| 2419621 | 10/1979 | France. |
| 772083 | 4/1957 | United Kingdom ............ 73/626 |

OTHER PUBLICATIONS

Bernardi et al.–A Dynamicall Focused Annular Array, 1976 Ultrasonics Symposium Proceedings, pp. 157–159, Sep.–Oct. 1976.

Primary Examiner—Charles A. Ruehl
Attorney, Agent, or Firm—Anthony H. Handal

[57] ABSTRACT

An echography device with dynamic focusing and sectorial scanning, comprising a transmitting portion (16) and a receiving portion (18) constituting piezoelectric transducers (4), juxtaposed in a form of a linear bar (2), each transducer (4) being associated with a delay line (26,32), the delays applied when a wave is being received being determined as a function of a reference dependent on the delays when the wave is being retransmitted and stored in a digital memory (34), the said reference being fed into a frequency adjustable oscillator (42) associated with a servo-device (38, 56, 54) through a computer.

6 Claims, 4 Drawing Figures

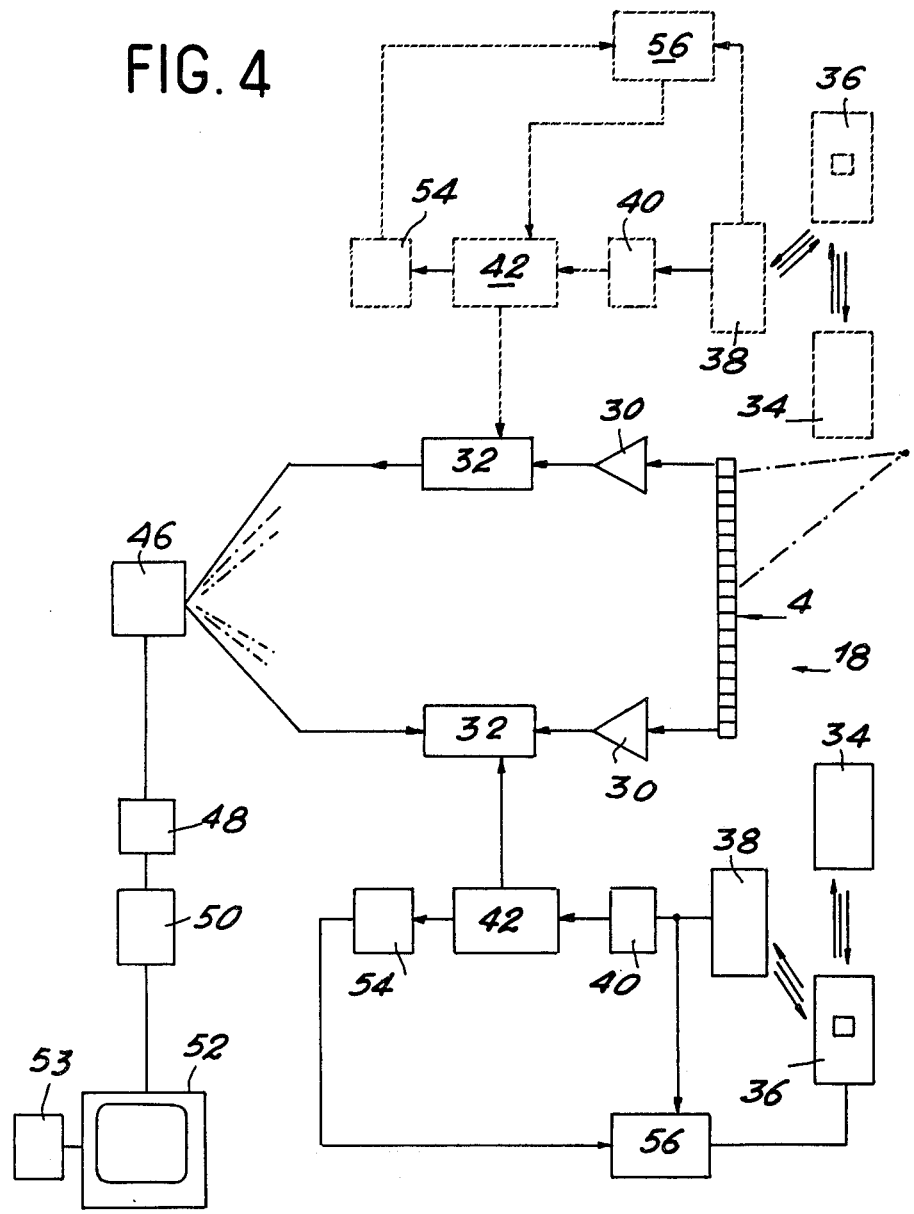

DYNAMIC FOCUSING AND SECTORIAL SCANNING ECHOGRAPHY DEVICE

The present invention relates to a dynamic focusing and sectorial scanning echography device.

The operation of an echography device is based on the use of ultrasonic waves, said waves being pressure waves propagated through an elastic medium. A well known feature of sonic or ultrasonic waves is to generate an echo when reflected by an obstacle. At each discontinuity between two mediums with different acoustic properties, a portion of the wave energy is transmitted and the balance is reflected by the interface. The latter wave, so called "echo", is the one that is detected and exploited in sonars and in echographic apparatus.

In the medical echography techniques, a device or probe provided with a transducer capable of transmitting ultrasonic waves is applied on the patient's skin. The thus-transmitted waves are propagated through the tissues and are reflected by the interfaces. The echoes provided by said interfaces reach the transducer (the latter then acting as a receiver), with a certain delay with respect to the transmission, said delay being all the greater as the reflecting surface is farther from the probe.

Once the time required for a full to-and-fro movement of the ultrasonic wave is spent, a new pulse is transmitted, and so on.

The echoes are displayed e.g., on the screen of an oscilloscope. These echoes can be displayed, e.g., in the B-mode, that is in a plane passing through the probe, which permits to determine the position of the echo with respect to said probe. The echo amplitude, and therefore the luminous intensity of the light-spot on the oscilloscope screen, is an indication of the size of the discontinuity. A 2-D image can be obtained by manually displacing a probe on the patient's skin and, at every moment, the respective echoes are located on the screen. The rate in the formation of images requires the use, either of a storage oscilloscope, or, in the case of the latest apparatus, of digital memories.

Moving a single probe leads to unrealistic durations in the formation of images, whenever the problem is to observe moving organs. A possible solution consists in replacing the single probe by a bar of small size comprising a large number of juxtaposed transducers adapted to provide a linear or sectorial scanning.

In the case of a linear scanning, the various transducers of the bar are actuated in turn, each shot providing the image of a line on the oscilloscope.

In the case of a sectorial scanning, each transmitting transducer is connected to an electronic delay line. During each shot of ultrasonic waves, each transducer is caused to transmit with a slight delay with respect to the neighbouring one, e.g. from the left to the right of the small bar. The wave resulting from all the elementary wavelets is a wave that is oblique with respect to said bar. By modifying the series of delays from one shot to another, it is possible to carry out the quick electronic scanning of the investigating beam, over a well defined angular sector, the probe being kept steady.

In echography devices, the resolving power permitting to distinguish two targets situated along the "shooting line", viz the longitudinal resolving power, is very good, since it is related only to the duration of the transmitted pulse. On the other hand, the main drawback of such techniques lies in their poor lateral resolving power, the latter being actually related to the width of the investigating beam.

That drawback is partially obviated by resorting to large diameter focusing probes permitting to obtain an ultrasonic beam that is thin enough, but such probes are cumbersome and should be manipulated in a basin spaced from the human body to be examined.

For focusing the reception of an ultrasonic wave by means of a transducer bar, use is made of electronic delay lines, the delay being determined according to the following intricate law:

$$\tau = \frac{F}{1.5}\left(1 - \sqrt{1 - 2\frac{d_i}{F}\sin\theta + \left(\frac{d_i}{F}\right)^2}\right)$$

where $\tau$ is the delay of a transducer i with respect to the middle portion of the bar; $d_i$, the distance between the transducer i and the middle portion of said bar; F the focusing length and $\theta$ the shooting angle during the transmitting step. The wave reaches first the middle transducer, then, with a slight shift, the neighbouring transducers. The electric signal provided by the middle transducer is the most delayed one, while the signal provided by the neighbouring transducers are less and less delayed, so that all the signals reach the receiving circuit exactly at the same time and are added up therein. The effect of such a plurality of delay lines is the same as that of an ordinary acoustic lens.

As disclosed above, the sectorial scanning of the ultrasonic beam permits, for the same depth-investigated field, to use narrower, and therefore more easily positioned, bars, which is a great advantage in particular in the field of cardiology.

However, as regards acoustics, the major drawback is to have a lens of small aperture (the width of existing bars being from 1 to 2 cm), which leads to a poor resolving power.

In an article entitled: "Les transducteurs a reseau annulaire focalisant" (annularly-arranged focusing transducers with detailed survey of the points of echo-formation), published in Acta Electronica of Feb. 22, 1979, pages 119 to 127, is described an echography device providing, first, when the ultrasoning wave is being transmitted, a focusing sequentially at each point of a straight line at right angles to the transmitting surface and, secondly, an electronic focusing when the ultrasonic wave is being received; electronic means are provided for sequentially modifying the position of that transmitting straight line, thus permitting a 3-D scanning.

The above disclosure sets the principle of such a device, without however providing the means for manufacturing same. In addition, the manufacture of such a device is rather intricate, since it requires the use of a transceiver and comprises several transducers arranged in mosaic-fashion and connected to an electronic switching device by means of which they are annularly and concentrically arranged.

In that device, focusing at the moment of receiving the ultrasonic wave is obtained by using, as delay lines, shifting analog registers controlled by clock signals delivered by an oscillator. As noted by the author himself of the above article, the use of oscillators for controlling such delay lines sets a certain number of problems, relating in particular to the shifting with time of such oscillators.

The present invention relates to an echography device improved with respect to those of the prior art, permitting, as the one described above, to obtain a focusing with detailed survey of the points of echo-formation, but based on the combination of a sectorial scanning and a focusing operation when the ultrasonic wave is being received. Moreover, the present invention provides practical means for making such an echography device.

That device provided with a linear bar of juxtaposed piezoelectric transducers, comprises, a transmitting portion, constituted by transducers capable of being electrically energized and adapted to transmit the waves on the one hand, and a receiving portion constituted by transducers adapted to receive ultrasonic waves provided by echoes, on the other hand. The transmitting transducers are energized by delayed electric signals, so that the ultrasonic wave transmitted is arranged obliquely with respect to the bar, and each receiving transducer is electrically connected to a delay line, said line being in fact a shifting analog register controlled by clock signals delivered by an oscillator, the delays generated by said registers being equal to the clock period. That device is characterized in that the oscillators are frequency-controlled oscillators, and in that it comprises:

means for digitally storing the control signals of each of said oscillators so as to store the plurality of delays generated by the various shifting registers, in such a manner that the signals detected by the receiving transducers should correspond to the ultrasonic waves transmitted by a given echo-point, the said means permitting to modify these delays at each echo point and at every moment, said delays being dependent on a stored reference the latter being in turn dependent on the transmission direction of the ultrasonic waves; and an adder connected to the various delay lines, the output of said adder corresponding to the amplitude of the echo issuing from said point.

With the help of shifting analog registers controlled by a frequency-adjustable oscillator, it is possible to obtain a continuous focusing at the point reached by the median front portion of the transmitted wave, since the delays, when receiving the waves, can be modified at every moment, for each transmission of ultrasonic waves and for each receiving transducer.

According to a preferred embodiment, to each oscillator is associated a frequency servo-device for rendering the frequency delivered by the oscillator equal to the reference-frequency. That servo-device comprises e.g., a counter adapted to control the frequency of the associated oscillator and a comparator adapted to compare the latter frequency with the digitally-stored frequency reference.

That servo system permits to solve the problems related to the shifting with time of the oscillators.

According to another preferred embodiment, the transmitting portion of the bar lies exclusively in the middle portion of the latter, while the receiving portion thereof lies exclusively on the sides. Moreover, the transmitting portion is electrically and mechanically insulated from the receiving portion.

Such an arrangement permits to avoid any influence of the transmission noise, or the high-energy transmission, on the very-low-level received waves, and to increase the focusing power, due to the elimination of the middle portion, the latter receiving energy but contributing but poorly to the focusing operation.

Another object of the present invention is to provide a device adapted to generate a set of delays variable with time on analog signals, said device being applicable, in particular to an echography device in which the transmitting transducers are energized by delayed electric signals and/or in which receiving transducers transmit electric signals between which delays are introduced, said delays being generated in shifting analog registers, each of which is controlled by clock signals delivered by an oscillator, said delays being equal to the clock period. That device is characterized in that the oscillators are frequency-controlled oscillators and in that it comprises means for digitally storing the control signal of each of said oscillator, with a view to storing in their entirety the delays generated by the various shifting registers, said delays corresponding to a stored reference.

Figure 2:
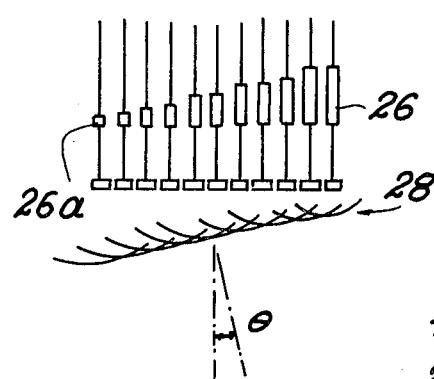
Figure 3:
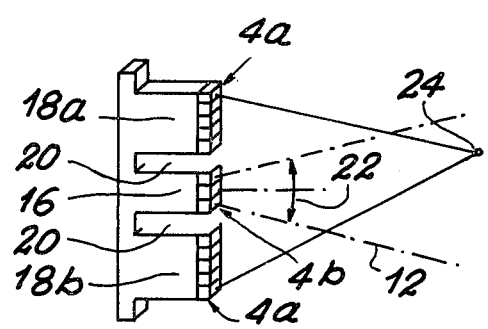

Other features and advantages of the present invention will appear from the following description, given merely by way of example, with reference to the following drawing, in which FIG. 1 diagramatically represents a sectorial scanning echography device, FIG. 2 diagramatically represents a transducer bar according to the present invention;

FIG. 3 diagramatically represents the means for generating delays when the ultrasonic wave is being transmitted; and FIG. 4 diagramatically represents the means for generating delays when the ultrasonic wave is being received.

The echography device such as diagramatically shown in FIGS. 1 and 2 comprises bar, usually of ceramics, constituted by a plurality of juxtaposed piezoelectric transducers 4. In order to obtain the echography of an organ of the body, it is only sufficient to apply said bar 2 on the patient's body, in register with the organ to be observed. Said bar 2 is electrically connected, by means of a plurality of coaxial wires such as 6, to an apparatus 8 containing the various electronic circuits necessary for operating the device. That apparatus 8 can be electrically connected to a storage oscilloscope such as 10 adapted to visualize an echography. Such as an echography device combining the sectorial scanning at the moment ultrasonic waves are being transmitted (as diagramatically shown at 12) with a continuous focusing, viz. a focusing at each moment on the point reached by the transmitted investigating beam, permits to obtain the outline of an organ in the form of dotted lines such as 14.

Bar 2 is constituted by a narrow transmitting portion 16 in the middle thereof and by the receiving portion 18, comprising two portions 18a and 18b situated on both sides of said transmitting portions 16. Preferably, the latter portion 16 is electrically and mechanically insulated from the receiving portion 18 by means of notches such as 20. These notches can be made, in said bar 2 of ceramics, by means of a diamond-saw or a wire-saw.

With the help of such a mechanical and electrical insulation, it is possible to eliminate the reverberation of the transmission noise (high-energy transmission) on the very-low-level reception, and to increase the focusing power, since the median portion, viz. the transmitting portion 16 of bar 2, contributes but very little to the focusing operation.

A thus-arranged bar constitutes a focusing lens, the aperture of which is greater than the aperture of the lenses of the prior art, since that bar is wider (about 4 cm) than the sectorial scanning bars (about 2 cm-wide) of the prior art, while being however shorter and being provided, for the passage of the ultrasonic beam, with a window 22 (about 1.5 cm wide) narrower than the windows of the bars of the prior art (about 2 cm wide). All the above features permit to obtain not only the focusing of the beam, e.g. in one point such as (24), but in addition, a better resolving power.

It is to be noted that a greater aperture would not allow to maintain a fair acoustic coupling between the transducers and the patient, especially in the case of an echography carried out in register with the patient's ribs. On the other hand, an echography device according to the present invention permits to observe organs of the body situated behind the ribs, in view of small size and of use of a sectorial scanning bar, which is impossible with the device, the principle of which is disclosed in the above-mentionned article of "acta electronica".

Such a sectorial scanning is obtained through the association of an electronic delay line 26, as diagrammatically shown in FIG. 3, with each transmitting transducer 4b, viz. transducers capable of being energized by electric signals and transmitting ultrasonic waves. At the moment of a shooting transmission (transmission of an ultrasonic wave), the most leftward transducer is the first to transmit, then from the left to the right, each transducer transmits with a slight delay with respect to the previous one. The thus-obtained wave 26 makes an angle $\theta$ with respect to the axis normal to bar 2. By modifying the delays from one shot to another, said delays following an arithmetic progression, it is possible to obtain a quick scanning of the investigating beam.

To such a sectorial scanning is associated a continuous focusing. Such a focusing operation consists in providing delays in register with each receiving transducer 4a, in such a manner that the waves issuing from a given echo-point can be summed up in the phase. Such a continuous focusing is obtained, at each shot of ultrasonic waves, by generating delays capable of being modified while the wave is being propagated.

The means for obtaining said delays when the wave is being received, are shown in FIG. 4. To each receiving transducer 4a are associated an amplifier 30 and a delay line 32. These delay lines are obtained, e.g., by means of integreted circuits of society Philips and going by the name of PCCD (peristaltic charge coupled devices), or any other charge transfer devices of known type.

The use of these delay lines makes it necessary to frequently convert the delays applied to each receiving transducer 4a, since, in fact, the required delay of a given receiver transducer is obtained by modifying the transfer rate of said delay lines 32.

Delay lines 32 are analog shifting registers in which, for each clock pulse, is caused to flow an electric charge the value of which corresponds to the amplitude of the signals received. If, for instance, the delay line 32 comprises N cells, the delay to which is submitted the input signal in that delay line will be equal to the sum of the next N clock periods. To that end, a frequency-adjustable signal is generated, for piloting each delay line 32, according to a predetermined frequency law, the latter law being stored in a digital memory 34. A computer 36 permits, for the whole duration of propagation of the ultrasonic wave corresponding to a transmission, to read that memory 34 at a quick rate determining the frequency-change rate.

The frequency reference so selected by computer 36 is fed into another memory such as 38. The frequency reference thus stored in memory 38 is fed into a digital-analog converter 40 adapted to convert the frequency reference into a voltage adjustable with time in a frequency-adjustable oscillator 42 adapted to feed the clock signals in the corresponding delay line 32, so as to obtain the so-called "focusing with a detailed survey of the point of echo-formation".

The signals issuing from a given echo-point are summed up in phase by means of an adder such as 46.

The thus-summed up signals are filtered by a filter 48 with a high rejection rate, adapted to eliminate the clock-frequency noises, then they are rectified and submitted to a peak detection by means of a device 50, so as to provide a suitable echography capable of being visualized on the screen of an oscilloscope such as 52, associated with an angular scanning device 53 adapted to reproduce the angular scanning of the ultrasonic beam.

In order to obtain a focusing point of small size, it is necessary to associate with each oscillator 42, a servo-device or a self-aligning device, so as to reduce the phase-shift of said oscillators likely to lead to a large difference between actual delays, viz. the delays referenced in the corresponding delay lines 32, and the theoretically obtained delays, the latter being predetermined, according to the frequency law stored in digital memory 34.

That servo-device comprises a counter 54 for controlling the frequency of the corresponding oscillator 42, by counting the number of clock strokes within a given period. The frequency provided by the oscillator is compared, by means of a comparator such as 56, with the frequency reference stored in memory 38. Should any difference appear between the delay provided by the oscillator and the delay reference, the comparator will feed a signal into computer 36, the latter feeding again into oscillator 42, through memory 38 and converter 40, a modified frequency reference that is applied to a corresponding delay line 32. Such a change in the reference permits to make up for the delay to be applied to the corresponding transducers.

In order to modify the frequency oscillator 42, the comparator 56, instead of feeding a signal into computer 36, can feed directly into said oscillator 42 an error signal equal to the difference between the signals issued from the oscillator and those issued from memory 38, which permits to modify the oscillator frequency.

Two variants adapted to modify the frequency are diagramatically shown in FIG. 4.

All the electronic circuit associated with each delay line 32, the latter being, in its turn, associated with a receiving transducer 4a, permits to obtain a good detailed survey of the points of echo-formation, viz. a fair continuous focusing on the point reached by the transmitted wave front.

While, as regards delays at the moment when the wave is being transmitted, only delays following a law that does not permit to obtain focusing at the moment when the wave is being transmitted, have been contemplated quite obviously, however, a focusing when the wave is being transmitted can be obtained in the same way as focusing when the wave is being received, by resorting to delays that comply with a suitable variation law. In such a case, focusing can be carried out only for one point of the shooting axis, at each shot.

What is claimed is:

1. An echography device containing a linear bar of juxtaposed piezoelectric transducers, said bar comprising a transmitting portion, said transmitting portion comprising transmitting transducers adapted to transmit ultrasonic waves, said transmitting transducers being energized by delayed electric signals so that said transmitted ultrasonic waves are oblique with respect to said bar, and a receiving portion, said receiving portion comprising receiving transducers adapted to receive ultrasonic waves reflected from echo-points, each of said receiving transducers being electrically connected to a separate shifting analog register controlled by clock signals delivered by an associated oscillator, each of said shifting registers being adapted to generate a delay equal to the clock period, wherein said oscillators are frequency-controlled and each of said oscillators is associated with a frequency servo-device adapted to render the frequency delivered by said oscillator equal to a reference frequency, and further comprising:

(a) means for digitally storing a value related to said clock signals of each of said oscillators so as to store the plurality of delays provided by said shifting registers in order that the signals detected by said receiving transducers correspond to the ultrasonic waves reflected by a single echo-point, said means permitting the modification of said delays for each echo-point and at any moment, said delays being determined by said reference frequency which is dependent on the transmitting direction of said ultrasonic waves; and (b) an adder connected to said shifting analog registers, the output signal provided by said adder corresponding to the amplitude of the ultrasonic waves reflecting from said single echo-point.

2. An echography device according to claim 1, wherein said transmitting portion of said bar occupies only the median portion of said bar and said receiving portion is situated only laterally.

3. An echography device according to claim 2, wherein said transmitting portion is electrically and mechanically insulated from said receiving portion.

4. An echography device according to claim 1, wherein said servo-device comprises a counter which determines the frequency of said associated oscillator by counting the number of said clock signals within a predetermined period and a comparator permitting comparison of the frequency of said associated oscillator with said reference frequency.

5. An echography device according to claim 1, wherein said reference frequency is determined in accordance with a predetermined frequency law stored in a digital memory, and said digital memory is read at a quick rate and continuously by means of a computer.

6. An echography device according to claim 1, wherein said adder is followed by a filter, then by a rectifier and a peak detection circuit.

* * * * *